United States Patent [19]
Shaner

[11] Patent Number: 5,991,714
[45] Date of Patent: Nov. 23, 1999

US005991714A

[54] METHOD OF IDENTIFYING DATA TYPE AND LOCATING IN A FILE

[75] Inventor: Richard Allen Shaner, Seabrook, Md.

[73] Assignee: The United States of America as represented by the National Security Agency, Washington, D.C.

[21] Appl. No.: 09/064,063

[22] Filed: Apr. 22, 1998

[51] Int. Cl.$^6$ .................................................... G06F 17/28
[52] U.S. Cl. .................................. 704/9; 704/1; 707/530
[58] Field of Search ....................... 704/1, 9, 10; 707/530, 707/531, 532, 102; 382/229

[56] References Cited

U.S. PATENT DOCUMENTS

| | | |
|---|---|---|
| 5,062,143 | 10/1991 | Schmitt . |
| 5,371,807 | 12/1994 | Register et al. . |
| 5,418,951 | 5/1995 | Damashek . |
| 5,463,773 | 10/1995 | Sakakibara et al. . |
| 5,526,443 | 6/1996 | Nakayama . |
| 5,548,507 | 8/1996 | Martino et al. . |
| 5,706,365 | 1/1998 | Rangarajan et al. . |
| 5,717,914 | 2/1998 | Husick et al. . |
| 5,724,593 | 3/1998 | Hargrave, III et al. ............... 704/7 |

Primary Examiner—Forester W. Isen
Assistant Examiner—Patrick N. Edouard
Attorney, Agent, or Firm—Robert D. Morelli

[57] ABSTRACT

A method of identifying the types of data contained in an electronic file of unknown data type by gathering exemplary files of each data type of interest; counting the number of unique n-grams within each exemplary file; determining a weight for each unique n-gram; listing the unique n-grams in the exemplary files of a particular data type by descending magnitude of weight for each data type of interest; selecting the top m weighted n-grams and their associated weights; establishing a threshold for each data type of interest; selecting a length of data from the electronic file; listing every n-gram in the data selected; giving each listed n-gram, that was also selected, the weight that that n-gram was given for each data type of interest; summing the weights given to each n-gram according to data type; comparing the sums to the thresholds established in order to determine the types, if any, of the selected data; recording the location of the selected data if it is of a data type of interest; stopping if the number of selected lengths of data reached a user-definable number, otherwise selecting another length of data from the file that is the same length as that selected previously, where the newly selected data overlaps with the previously selected data by at least one position; and repeating the steps from listing every n-gram to stopping using the newly selected data.

17 Claims, 6 Drawing Sheets

GATHERING EXEMPLARY FILES FOR EACH DATA TYPE OF INTEREST

COUNTING THE UNIQUE N-GRAMS IN EACH EXEMPLARY FILE

DETERMINING THE WEIGHT OF EACH UNIQUE N-GRAM

LISTING THE UNIQUE N-GRAMS IN EACH DATA TYPE BY WEIGHT

SELECTING THE M TOP WEIGHTED N-GRAMS FOR EACH DATA TYPE

SETTING THRESHOLDS FOR DETERMINING EACH DATA TYPE

|         | 1ST DATA TYPE | 2ND DATA TYPE | 3RD DATA TYPE |
|---------|---------------|---------------|---------------|
| X       | 9    7        | 0    0        | 0    1        |
| XY      | 5    6        | 1    2        | 0    0        |
| YYZ     | 0    0        | 8    7        | 0    1        |
| XYZY    | 2    1        | 7    7        | 0    0        |
| ZYZZY   | 0    0        | 0    0        | 6    8        |
| ZYZYZZ  | 0    0        | 3    1        | 7    7        |
| XYZXYZX | 3    4        | 3    4        | 5    3        |

FIG. 3

|         | 1ST DATA TYPE | 2ND DATA TYPE | 3RD DATA TYPE |
|---------|---------------|---------------|---------------|
| X       | 5.8           | 0.0           | 0.0           |
| XY      | 2.0           | 1.5           | 0.0           |
| YYZ     | 0.0           | 4.8           | 0.0           |
| XYZY    | 1.3           | 1.7           | 0.0           |
| ZYZZX   | 0.0           | 0.0           | 11.1          |
| ZYZYZZ  | 0.0           | 1.3           | 2.0           |
| XYZXYZX | 0.0           | 0.0           | 0.000009      |

FIG. 4

|  | 1ST DATA TYPE | 2ND DATA TYPE | 3RD DATA TYPE |
|---|---|---|---|
| X | 5.8 | | |
| XY | 2.0 | 1.5 | |
| YYZ | | 4.8 | |
| XYZY | 1.3 | 1.7 | |
| ZYZZX | | | 11.1 |
| ZYZYZZ | | | 2.0 |
| XYZXYZX | | | 0.000009 |

|  | 1ST DATA TYPE | 2ND DATA TYPE | 3RD DATA TYPE |
|---|---|---|---|
| X | 5.8 | 0.0 | 0.0 |
| XY | 4.0 | 3.0 | 0.0 |
| YYZ | 0.0 | 14.4 | 0.0 |
| XYZY | 5.2 | 6.8 | 0.0 |
| ZYZZX | 0.0 | 0.0 | 55.5 |
| ZYZYZZ | 0.0 | 0.0 | 12.0 |
| XYZXYZX | 0.0 | 0.0 | 0.000063 |
|  | 15 | 24.2 | 67.5 |

FIG. 7

```
B BBBBBBBBBBBBBBBBBBBBBBBBBBBB
  BBBBBBBBBBBBBBBBBBBBBBBBBBBBBB
  BBBBBBBBBBBBBBBBBBBBBBBBBBBBBB
  BBBBBBBBBBBBBBBBBBBBBBBBBBBBBB
```

METHOD OF IDENTIFYING DATA TYPE AND LOCATING IN A FILE

FIELD OF THE INVENTION

This invention relates to image analysis and, more particularly, to identification of the type, and location, of data contained in an electronic file.

BACKGROUND OF THE INVENTION

The amount of data being transmitted electronically is ever increasing. Electronic data may be in any language, may have been generated using any type of word-processor, may or may not be in a format that can be executed by a computer, may be uncompressed or compressed using any type of compression scheme, and so on. To automatically process electronic data properly, a truly automated data processing system must be able to identify the type of data contained in a received electronic file.

U.S. Pat. No. 5,062,143, entitled "TRIGRAM-BASED METHOD OF LANGUAGE IDENTIFICATION," discloses a method of using 3-grams to identify the language of a received document. U.S. Pat. No. 5,062,143 is limited by requiring the use of a fixed length n-gram. In addition, U.S. Pat. No. 5,062,143 does not attempt to further distinguish any data files from one another as does the present invention. Also, U.S. Pat. No. 5,062,143 does not include n-gram weighting as does the present invention. Furthermore, U.S. Pat. No. 5,062,143 results in one similarity determination and does not make multiple determinations as does the present invention. U.S. Pat. No. 5,062,143 is hereby incorporated by reference into the specification of the present invention.

U.S. Pat. No. 5,371,807, entitled "METHOD AND APPARATUS FOR TEXT CLASSIFICATION," discloses a device for and a method of classifying text as being similar to one or more known classes by requiring the received text to be in a natural language. The text is then parsed into a list of recognizable keywords. The keywords may be words, phrases, or regular expressions. From the list of keywords, certain facts about the received text are deduced. The keyword list of the received text is then compared to a list of text classes to see which class of text the received text most resembles. A similarity score for the received text is generated. From the similarity score, the received text is determined to most resemble appropriate classes If the similarity score for the received text is above a user-definable threshold the received text is determined to be of the class the received text most resembles. U.S. Pat. No. 5,371,807 may not be able process text received in multiple languages, text from different word-processors, compressed text, executable code, or non-textual data as can the present invention which is based on n-gram selection and not on keyword selection. U.S. Pat. No. 5,371,807 is hereby incorporated by reference into the specification of the present invention.

U.S. Pat. No. 5,418,951, entitled "METHOD OF RETRIEVING DOCUMENTS THAT CONCERN THE SAME TOPIC," discloses a method of using an n-gram of a certain fixed length to characterize received data and known data. The commonality between the various files is then removed to further refine the characterization of each file. The refined characterization of the received file is then compared to the stored files to determine which of the stored files the received file is most similar to. U.S. Pat. No. 5,418,951 is limited by requiring fixed length n-grams. Beyond the removal of commonality, U.S. Pat. No. 5,418, 951 does not attempt to further distinguish any data files from one another as does the present invention. U.S. Pat. No. 5,418,951 does not include n-gram weighting as does the present invention. Furthermore, U.S. Pat. No. 5,418,951 results in one similarity determination and does not make multiple determinations as does the present invention. U.S. Pat. No. 5,418,951 is hereby incorporated by reference into the specification of the present invention.

U.S. Pat. No. 5,463,773, entitled "BUILDING OF A DOCUMENT CLASSIFICATION TREE BY RECURSIVE OPTIMIZATION OF KEYWORD SELECTION FUNCTION," discloses a method of classifying documents based on keyword selection. The document classification method of U.S. Pat. No. 5,463,773 may not be optimal if received documents are in different languages. Also, a document classification method based on keywords may not work properly on non-textual data, compressed files, or executable code. The present invention which is not based on keyword selection overcomes all of these potential problems. U.S. Pat. No. 5,463,773 is hereby incorporated by reference into the specification of the present invention.

U.S. Pat. No. 5,526,443, entitled "METHOD AND APPARATUS FOR HIGHLIGHTING AND CATEGORIZING DOCUMENTS USING CODED WORD TOKENS," discloses a device for and a method of identifying the topic of a received document by converting the words in a received document to abstract coded character token. Certain tokens are then removed based on a list of stop tokens. Numbers are included on the stop token list. classifying documents based on keyword selection. The topic identification method of U.S. Pat. No. 5,526,443 may not be optimal for processing compressed documents, executable code, or non-textual documents as can the present invention which does not use tokens or previously constructed stop lists. U.S. Pat. No. 5,526,443 is hereby incorporated by reference into the specification of the present invention.

U.S. Pat. No. 5,548,507, entitled "LANGUAGE IDENTIFICATION PROCESS USING CODED LANGUAGE WORDS," discloses a method of identifying the language of a received document by comparing the words in the received document to a plurality of preconceived word frequency tables for various languages. Each language table includes preselected words in that language and numbers associated with each word that represents the normalized frequency of occurrence of that word in that language. The words in the received document are compared to the words in each language table. If a word matches then the document receives the normalized frequency of occurrence value for that word. For each language table, the normalized frequency of occurrence numbers for each word in the received document that matches a word in the language table are added up to obtain a score that indicates how similar the received document is to the language of the language table. The language for which the received document receives the highest score is determined to be the language of the received document. The language identification method of U.S. Pat. No. 5,548,507 may not be optimal for processing compressed documents, executable code, or non textual documents as can the present invention which does not use preconceived normalized frequency of occurrence values. Such values may not be able to be generated for anything other than natural language documents. U.S. Pat. No. 5,548, 507 is hereby incorporated by reference into the specification of the present invention.

U.S. Pat. No. 5,706,365, entitled "SYSTEM AND METHOD FOR PORTABLE DOCUMENT INDEXING USING N-GRAM WORD DECOMPOSITION," discloses a device for and a method of identifying documents that contain the n-grams of a natural language search query that has been parsed into a list of fixed length n-grams. The document retrieval method of U.S. Pat. No. 5,706,365 is not a method of identifying the type of data in an electronic file using n-grams as is the present invention, but a method of using n-grams to locate other documents that contain those n-grams. U.S. Pat. No. 5,548,507 is hereby incorporated by reference into the specification of the present invention.

U.S. Pat. No. 5,717,914, entitled "METHOD FOR CATEGORIZING DOCUMENTS INTO SUBJECTS USING RELEVANCE NORMALIZATION FOR DOCUMENTS RETRIEVED FROM AN INFORMATION RETRIEVAL SYSTEM IN RESPONSE TO A QUERY," discloses a method of storing a received document into a database having a plurality of document classes. Each received document is compared against a preconceived word list that is representative of one of the possible classes in the database. The class of the word list that compares most favorably to the received document is the class that the received document will be stored in. The storage method of U.S. Pat. No. 5,717,914 may not be optimal for processing compressed documents, executable code, or non-textual documents for which it may be impossible to generate a preconceived word list. The present invention can identify these types of data without having to generate a preconceived word list. U.S. Pat. No. 5,717,914 is hereby incorporated by reference into the specification of the present invention.

In an article entitled "Improving the retrieval of information from external sources," published in 1991 in *Behavior Research Methods, Instruments, & Computers,* pages 229–236, Susan T. Dumais discloses a statistical method called latent semantic indexing. This method does not rotate the information to any intuitively meaningful orientation as does the present invention. Furthermore, the method proposed by Dumais is more complex and, therefore, does not perform as well as the method of the present invention. Also, the specific steps of the present method and the equations used to characterize the data is different from the steps and equation used by Dumais.

In an article entitled "Using Linear Algebra For Intelligent Information Retrieval," published December 1995 in *SIAM Review,* Vol. 37, No. 4, pages 573–595, Michael W. Berry et al. disclose a statistical method that combines latent semantic indexing with singular value decomposition. Since the method of berry et al. is based on latent semantic indexing, it does not rotate the information to any intuitively meaningful orientation as does the present invention. Furthermore, the method of Berry et al. is more complex and, therefore, does not perform as well as the method of the present invention. Also, the specific steps of the present method and the equations used to characterize the data is different from the steps and equation disclosed by Berry et al.

SUMMARY OF THE INVENTION

It is an object of the present invention to automatically identify the type of data contained in an electronic file.

It is another object of the present invention to automatically identify the language used in an electronic file.

It is another object of the present invention to automatically identify the type of wordprocessor used to create an electronic file.

It is another object of the present invention to automatically identify the type of executable code, if any, contained in an electronic file.

It is another object of the present invention to automatically identify the data compression scheme, if any, used in an electronic file.

It is another object of the present invention to identify in an electronic file what languages were used and where, what type of word-processor was used and where, what type of executable code, if any, is included and where, and what type of data compression scheme, if any, was used.

The present invention is a method of identifying the type, and location, of data contained in a file, or document, that is in an electronic format. The types of data that the present invention may be used to identify include various languages, various types of word-processors that may have been used to create data in the file, various types of executable code that may be included in the file, and various compression schemes that may have been used to compress data in the file. The ability to identify all of these data types is believed to be novel. Also, the ability to identify the location of a particular data type within a file is believed to be novel.

The present invention first includes a series of steps to characterize each data type of interest. A file of unknown data type may then be compared to the characterization of each data type of interest in order to determine the type, and location, of the data contained within the file.

The first step in the characterization process is to gather at least one exemplary file for each data type of interest to a user.

The second step in the characterization process is to count the number of times each unique n-gram occurs in each at least one exemplary file, where n is a range of integer values.

The third step in the characterization process is to determine a weight for each unique n-gram identified above.

The fourth step in the characterization process is to generate, for each set of exemplary files, a list of the unique n-grams contained therein by descending magnitude of weight.

The fifth step in the characterization process is to select the m highest weighted n-grams from each list generated in the last step.

The sixth step in the characterization process is to associate each n-gram selected in the last step with its weight for each data type of interest.

The seventh, and last, step in the characterization process is to establish a user-definable threshold for each data type of interest that may be used to determine whether or not a selected portion of a file of unknown data type is of a data type of interest.

The following steps are performed on an electronic file of unknown data type in order to determine whether or not it contains a data type of interest and where.

The first step in identifying the type, and location, of data in a file is to select a user-definable length of data from the file.

The second step in identifying the type, and location, of data in the file is to list every n-gram in the selected data, where n has the same range of integer values as in the data-type-characterization process described above.

The third step in identifying the type, and location, of data in the file is to give each n-gram listed in the last step that also appears in the list of n-grams generated in the sixth characterization step the weights that that n-gram was given during the data-type-characterization process.

The fourth step in identifying the type, and location, of data in the file is to sum the weights given to each n-gram in the last step according to data type.

The fifth step in identifying the type, and location, of data in the file is to compare each sum arrived at in the last step to the user-definable threshold for the corresponding data type of interest in order to determine whether or not the selected data is of a data type of interest.

The sixth step in identifying the type, and location, of data in the file is to record the location of the selected data if the selected data is determined to be of a data type of interest.

The seventh step in identifying the type, and location, of data in the file is to stop if a user-definable number of segments have been selected, otherwise select another length of data from the file that is the same length as that selected in the first identification/location step, where the starting location of the newly selected data differs from the previously selected data by at least one position and newly selected data overlaps the previously selected data by at least one position.

The eighth step in identifying the type, and location, of data in the file is to repeat identification/location steps two through seven using the newly selected data.

After the user-definable number of segments have been selected, the user will know the data type, and location, of each identifiable segment selected from the file.

BRIEF DESCRIPTION OF THE DRAWINGS

FIG. 3 is a chart of the frequency of occurrence of seven n-grams within two exemplary documents for each of three data types of interest;

FIG. 4 is a chart of the weights of the seven n-grams for each of the three data types of interest;

FIG. 7 is a chart of how the n-grams of the segment selected in FIG. 6 are scored and summed;

FIG. 8 is an illustration of the file of FIG. 6 with a new segment selected therefrom.

DETAILED DESCRIPTION

The present invention is a method of identifying the types, and locations, of data contained within an electronic file, or document, of unknown data type. The present invention may be used to identify languages, the type of word-processors used to create data within the file, the type of executable code that may be included within the file, and the compression schemes that may have been used to compress data within the file. A file may contain one data type of interest, more than one data type of interest, or no data types of interest.

Any language, wordprocessor, executable code, or data compression scheme may be identified using the present invention. Examples of some word-processors that may be identified using the present invention include, but is not limited to, Word, Wordperfect, Framemaker, Postscript, and Interleaf. Examples of executable code that may be identified using the present invention includes, but is not limited to, executable code that runs on microprocessors manufactured by Intel (e.g., Pentium), Hewlett-Packard, SGI, Sun, Motorola, and IBM (e.g., PowerPC). Examples of data compression schemes that may be identified using the present invention include, but is not limited to, GZIP, Unix-Compress, GIF, and JFIF. The ability to identify all of these data types with a single method is believed to be novel. Also, the ability to identify the location of a particular identified data type within a file is believed to be novel.

Figure 1:
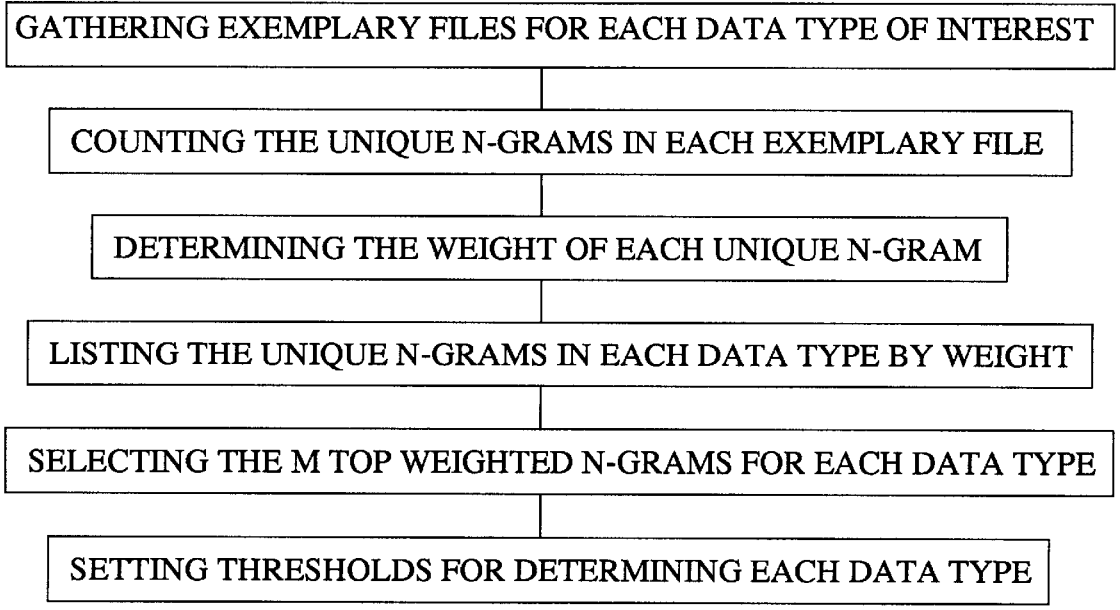
FIG. 1 is a list of steps necessary to characterize data types of interest.

The present invention first includes a series of steps to characterize each data type of interest to a user. These steps are listed in FIG. 1. A file of unknown data type will then be compared to the characterization of each data type of interest in order to determine the type, and location, of data within the file.

The first step in the characterization process is to gather at least one exemplary file of each data type of interest to the user.

The second step in the characterization process is to count the number times each unique n-gram occurs within the exemplary files for each data type of interest. The value n is a range of integers. In the preferred embodiment, the value n is a range of integers from 1 to 8. That is, unique 1-grams, 2-grams, 3-grams, 4-grams, 5-grams, 6-grams, 7-grams, and 8-grams will be counted in each set of exemplary files for each data type of interest. The use of a range of values for n instead of using a fixed value for n, which is believed to be novel, allows the data itself to indicate how it should best be characterized. A fixed value for n is often optimal for one type of data but is not optimal for another. For example, some types of data are best characterized by long n-grams while other types of data are best characterized by short n-grams. The present invention is not limited to one length of n-gram.

The third step in the characterization process is to determine a weight for each unique n-gram identified above. The formula used in the present invention for determining weight, which is believed to be novel, forces each data type to its own spatial region for ease of identification. The formula used in the present invention for determining weight is as follows:

$$w_{ti} = (\log(K(x_{ti}/N_t)+1)) \times ((1/\log N_t)(\Sigma(p_{tji}\log(1/p_{tij})))) \times (1-((1/\log L)(\Sigma(p_{ti}\log(1/p_{ti})))))^d,$$

where $w_{ti}$ is the weight of a particular n-gram i for a particular data type t;

where K is a constant, preferably $10^5$, that scales the term $(x_{ti}/N_t)$ away from unity;

where $N_t$ is the number of documents of type t;

where $x_{tji}$ is the number of occurrences of an n-gram i in exemplary document j of type t divided by the total number of bytes in document j;

where $x_{ti} = \Sigma x_{tji}$, summed from j=1 to j=$N_t$;

where $p_{tji} = x_{tji}/x_{ti}$;

where $\Sigma(p_{tji}\log(1/p_{tij}))$ is summed from j=1 to j=$N_t$;

where L is the number of data types of interest;

where $x_i = \Sigma x_{ti}$, summed from t=1 to t=L;

where $p_{ti} = x_{ti}/x_i$;

where $\Sigma(p_{ti}\log(1/p_{ti}))$ is summed from t=1 to t=L; and where d is a positive real number that controls the concavity of the term that contains d and d=3 in the preferred embodiment.

The weight $w_{ti}$ of n-gram i within data type t is the product of three terms. The first term is proportional to the logarithm of the frequency of occurrence of n-gram i within the set of all exemplary documents of type t.

The second term represents the relative entropy of the distribution of n-gram i within the set of all exemplary documents of type t. That is, the second term is proportion to how evenly n-gram i is distributed amongst the exemplary documents of type t. The more evenly n-gram i is distributed amongst the exemplary documents of type t the greater will be the value of the second term. The more exemplary documents of each type there are, the more advantage this term provides.

The third term is 1 minus the relative entropy of the distribution of n-gram i amongst all of the data types of interest. The third term is inversely proportional to how evenly n-gram i is distributed amongst the data types. That is, the more n-gram i occurs in one data type over the other data types the greater will be the value of the third term. The term d allows for user-defined trade-offs between the last two terms in the weight.

The n-gram weighting used in the present invention allows documents containing a mixture of data types to be used for training. The second term in the weight formula (i.e., the consistency term) insures that the n-grams that are selected are those that are consistent with the user-specified grouping. For example, when word-processor files are grouped by word processor, the top weighted n-grams are those contained in the word-processor control strings, which are consistent across all exemplary files of each type. However, if the same files are instead grouped by language, then a completely different set of n-grams will be the topweighted ones. In this case, the n-grams that are most discriminating for each language will be weighted highly., and thus selected for use in identification of unknown files. This method is believed to be superior to prior art methods.

The fourth step in the characterization process is to list, by magnitude of weight, the n-grams associated with each particular data type. The result is a number of lists equal to the number of data type of interest, where each list contains the unique n-grams contained within the exemplary files for a particular data type listed from highest weighted n-gram to lowest weighted n-gram. By using a range of values for n and ordering the n-grams by magnitude of weight, each data type of interest automatically indicates which n-gram lengths optimally characterize it. Such a result is not attainable using a fixed length n-gram. A fixed length n-gram is often optimal for one data type but not for another. Therefore, the present invention eliminates errors that occur in other single-sized n-gram methods due to the inability of these methods to select optimal n-gram sizes for all data types of interest.

The fifth step in the characterization process is to select the top m weighted unique n-grams from each list generated in the last step. The value m is a user-definable integer (e.g., m=2000). This step eliminates n-grams that are not useful for discriminating between different types of data and makes any calculation based on these weights more efficient. This also minimizes the storage requirement.

The sixth step in the characterization process is to combine the n-grams, and their associated weights, selected in the last step into a single list. An n-gram may be associated with a weight from more than one data type.

The seventh, and last, step in the characterization process is to establish a user-definable threshold, for each data type of interest, that may be used to determine whether or not a selected portion of a file of unknown data type is of one or more data types of interest.

Each threshold may be set initially to a fraction of the expected sum of weights for the corresponding data type. These initial thresholds may then be adjusted by the user based on empirical data. A selected segment from a file of unknown data type may be determined to be of no data type of interest, of one data type of interest, or of multiple data types of interest.

Figure 2:
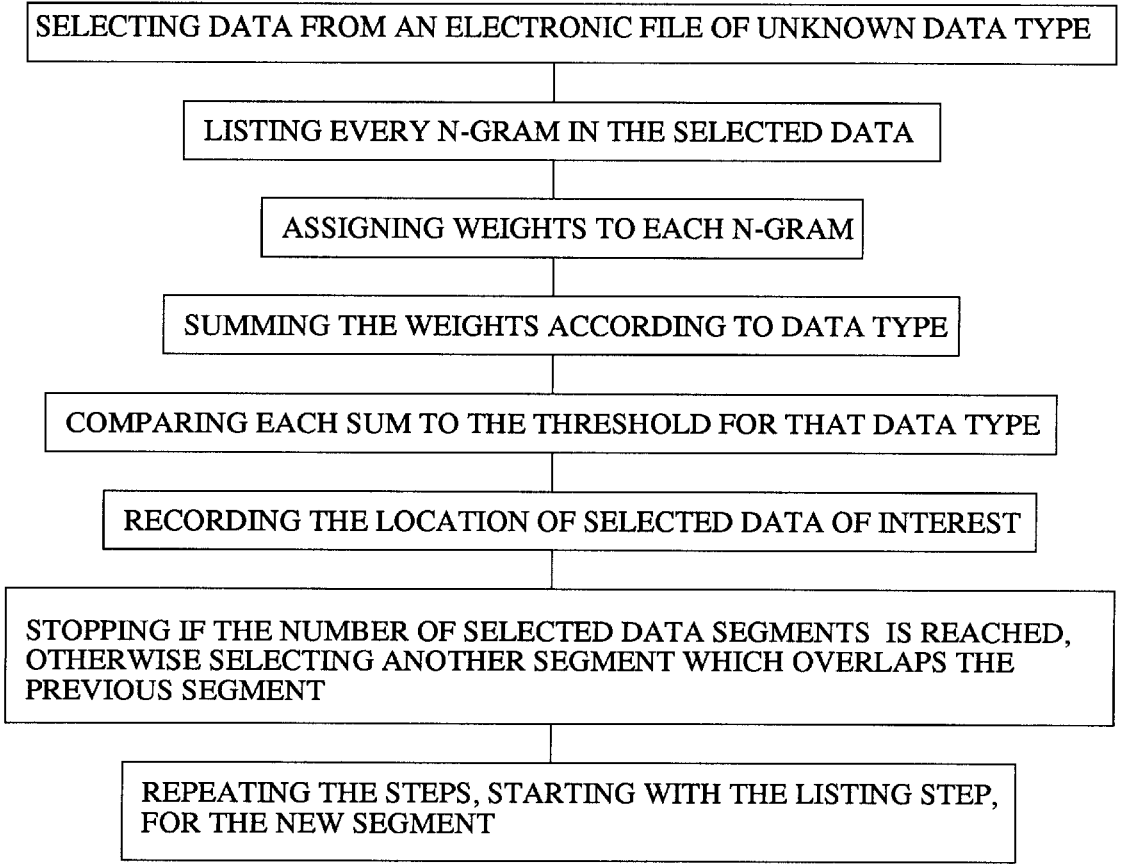
FIG. 2 is a list of steps necessary to compare a file of unknown data type to the characterized data types of interest.

FIG. 2 is a list of the steps necessary for determining whether or not an electronic file of an unknown data type contains one or more data types of interest and where in the file any data type of interest may be found.

The first step in identifying the type, and location, of data in a file is to select a user-definable length of data from the file. In the preferred embodiment, 250 bytes of data is selected from the beginning of the file. In an alternate embodiment, the user may determine from where in the file the segment is selected. In a second alternate embodiment, the entire file may be selected. The second alternate embodiment is useful for determining whether or not a file contains one or more data types of interest when the user does not care to know exactly where in the file a data type of interest may be found.

Selecting segments of a file that are smaller than the entire file (i.e., windowed mode) offers the great advantage of virtually eliminating false determinations or false hits (i.e., determining that a segment is of a data type that it really isn't). Windowed mode also makes the method more able to detect short strings of a data type of interest.

The second step in identifying the type, and location, of data in the file is to list every n-gram in the selected data. Here, n has the same range of integer values as it had in the data-type-characterization process listed above. In the preferred embodiment, n takes on every integer value from 1 to 8.

The third step in identifying the type, and location, of data in the file is to give each n-gram listed in the last step that also appears in the list generated in the sixth characterization step the weights that that n-gram was given during the characterization process. For example, if a 3-gram "tre" was given weights (0.0, 0.0, 0.3, 0.4) for four data types of interest and it appears in the list generated in the sixth characterization step then each occurrence of "tre" in the selected data from the file will be assigned these weights. N-grams that are found in a segment that are not found in the n-gram list generated in the sixth characterization step are not assigned weights, and require no computation other than that required to determine that they are not in the list. This makes any computation based on n-gram weights faster. For example, each occurrence of the 3-gram "tre," with weights (0.0, 0.0, 0.3, 0.4), in the selected length of data from the file will require only two operations.

The fourth step in identifying the type, and location, of data in the file is to sum the weights given to each n-gram in the last step according to data type. The result is a list of numbers that indicate how similar the selected segment is to each data type of interest. For example, if the segment selected from the file contained only three n-grams (e.g., two occurrences of "tre" and one occurrence of "ges," where each occurrence of "ges" is given the weights (0.5, 0.6, 0.7, 0.8)) then the selected segment would be given the sums of (0.5, 0.6, 1.3, 1.6). Each sum indicates how similar the segment is to the corresponding data type. In the preferred embodiment, weights of zero are not stored because they have no effect on the sum. Thus, in the case of an n-gram such as "tre," only 0.3 and 0.4 are stored, and only the last two of the four sums are modified, one for each nonzero weight. This eliminates unnecessary computation. Each sum indicates how similar the segment is to the corresponding data type.

The fifth step in identifying the type, and location, of data in the file is to compare each sum in the last step to each threshold established in the seventh characterization step in order to determine whether or not the selected data is of one or more data type of interest. If a sum is greater than a threshold for a particular data type then the selected segment is determined to be of that particular data type. A segment may be determined to be of more than one data type of interest. For example, if the thresholds for four data types of interest were set to (0.9, 0.5, 1.5, 1.0) then selected data with sums of (0.5, 0.6, 1.3, 1.6) would be considered to be of the second data type and the fourth data type and not of the first data type or the third data type.

The sixth step in identifying the type, and location, of data in the file is to record the location of the selected segment if the segment is determined to be of one or more data type of interest. The location of the segment need not be recorded if it is not determined to contain any data type of interest. The user may use any point within the selected segment as the location of the segment (e.g., the first point, the last point, or any point in between). In the preferred embodiment, the center point of the segment is used as the location of that segment. After this step, the data type(s) and corresponding location(s) of the selected segment is/are known. In an alternate embodiment, the location of segments that contain at least one data type of interest are not recorded, but instead statistical information concerning the selected segments are recorded (e.g., the percentage of selected segments that contain one or more data type of interest). The number of segments that achieve a sum greater than the threshold established for a data type of interest corresponds, roughly, to the percentage of the file that contains that type of data.

The seventh step in identifying the type, and location, of data in the file is to stop if a user-definable number of segments have been selected, otherwise select another length of data from the file that is the same length as that selected in the first step. In the preferred embodiment, the first segment selected is at the beginning of the file and the last segment selected is at the end of the file, but the present invention may employ any reasonable selection scheme (e.g., starting at the end of the file and proceeding to the beginning of the file). The present invention may also employ a scheme where less than every segment in the file is selected. That is, the present invention allows the user to select the first segment from anywhere in the file, proceed in any direction therefrom, and stop anywhere the user desires.

The starting location of the newly selected data may be such that the newly selected data overlaps with the previously selected data by as little as one byte or as much as all but one byte. The more overlap there is between adjacent segments, the more accurate will be the determination of data types in the file. In the preferred embodiment, the starting position of the newly selected data is one byte position to the right of the previously selected data so that the newly selected data shares all but one byte with the previously selected data (i.e., the maximum amount of overlap which yields the best determination of data types). Thus, the newly selected data and the previously selected data differ by only two bytes (i.e., the leftmost byte of the previously selected data which is not contained in the newly selected data and the right-most byte of data in the newly selected data that is not contained in the previously selected data). This embodiment allows the accumulated scores to be updated recursively with a minimum of computation. This greatly enhances the efficiency of the present invention.

The eighth step in identifying the type, and location, of data in the file is to repeat identification steps two through seven using the newly selected data.

After these steps have been completed, the user will know whether or not the file contains data of interest to the user and where in the file any such data is located. For a more efficient implementation of the present invention, the stored n-grams may be hashed to facilitate efficient look-up, and the weights may be scaled to fit a certain byte size.

To better illustrate the steps of the present invention, a simple example will be described. A user may be interested in identifying three types of data, and the user may have found two exemplary files for each data type. The value of n in this example takes on the integer values from 1 to 7. The unique n-grams contained within all of these exemplary files are x, xy, yyz, xyzy, zyzzx, zyzyzz, and xyzxyzx.

FIG. 3 is a chart of the frequency of occurrence of the seven n-grams listed above. If these seven n-grams were thought of as the vector (x, xy, yyz, xyzy, zyzzx, zyzyzz, xyzxyzx) then the frequency of occurrence of these n-grams in the first exemplary file of the first data type is represented by the vector (9, 5, 0, 2, 0, 0, 3). The frequency of occurrence of these n-grams in the second exemplary file of the first data type is represented by the vector (7, 6, 0, 1, 0, 0, 4). The frequency of occurrence of these n-grams in the first exemplary file of the second data type is represented by the vector (0, 1, 8, 7, 0, 3, 3). The frequency of occurrence of these n-grams in the second exemplary file of the second data type is represented by the vector (0, 2, 7, 7, 0, 1, 4). The frequency of occurrence of these n-grams in the first exemplary file of the third data type is represented by the vector (0, 0, 0, 0, 6, 7, 5). The frequency of occurrence of these n-grams in the second exemplary file of the third data type is represented by the vector (1, 0, 1, 0, 8, 7, 3).

FIG. 4 is a chart of the weights of the seven n-grams for each of the three data types of interest. Using the n-gram order as described above, the n-gram weights for the first data type, rounded to one decimal places where convenient, are 5.8, 2.0, 0.0, 1.3, 0.0, 0.0, and 0.0. The n-gram weights for the second data type are 0.0, 1.5, 4.8, 1.6, 0.0, 1.3, and 0.0. The n-gram weights for the third data type are 0.0, 0.0, 0.0, 0.0, 11.1, 2.0, and 0.000009.

Figures 5, 6:
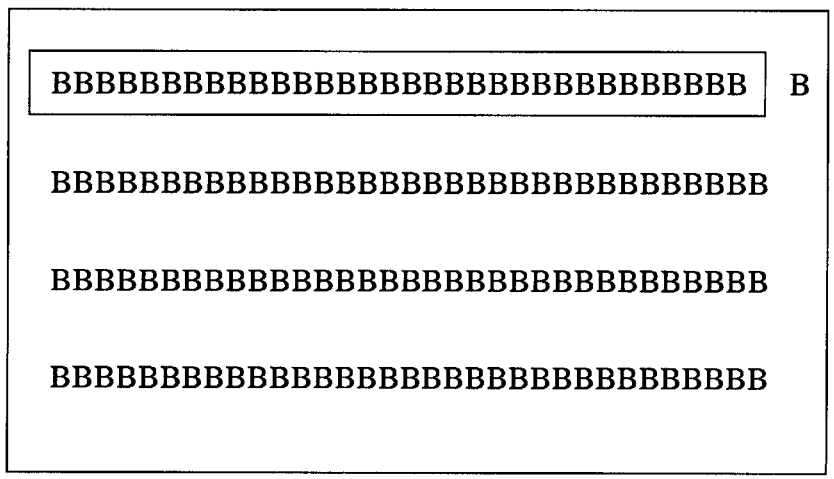
FIG. 5 is a chart of the top three weighted n-grams for each of the three data types of interest.
FIG. 6 is an illustration of a file of unknown data type with a segment selected therefrom.

FIG. 5 is a chart of the top three weighted n-grams for each data type. That is, x, xy, and xyzy for the first data type; xy, yyz, and xyzy for the second data type; and zyzzx, zyzyzz, and xyzxyzx for the third data type.

FIG. 6 is an illustration of a file of unknown data type with a segment selected therefrom. This segment may contain x once, xy twice, yyz three times, xyzy four times, zyzzx five times, zyzyzz six times, xyzxyzx seven times, and abcd eight times. Each n-gram that appears in the selected segment that does not appear in the list of the top three n-grams for a particular data type (i.e., abcd) would be assumed to have a weight of zero assigned to it. In the preferred embodiment, zero-weighted n-grams are not recorded at all. This saves memory space. Each n-gram that appears in the selected segment that does appear in the list of the top three n-grams for a particular data type would be given the weight of that n-gram. That is, the one x will be given a weight of 5.8 for the first data type, a weight of zero for the second data type, and a weight of zero for the third data type. Each xy will be given a weight of 2 for the first data type, a weight of 1.5 for the second data type, and a weight of zero for the third data type. Each yyz will be given a weight of zero for the first data type, a weight of 4.8 for the second data type, and a weight of zero for the third data type. Each xyzy will be given a weight of 1.3 for the first data type, a weight of 1.7 for the second data type, and a weight of zero for the third data type. Each zyzzx will be give n a weight of zero for the first data type, a weight of zero for the second data type, and a weight of 11.1 for the third data type. Each zyzyzz will be given a weight of zero for the first data type, a weight of zero for the second data type, and a weight of 2 for the third data type. Each xyzxyzx will be given a weight of zero for the first data type, a weight of 0 for the second data type, and a weight of 0.000009 for the third data type. In the preferred embodiment, a weight of zero is not stored and requires no computation.

FIG. 7 is a chart of the sums of the weights by type of the n-grams in the segment selected in FIG. 6. That is, the weights of the n-grams in the segment according to the first data type sum to 15. The weights of the n-grams in the segment according to the second data type sum to 24.2. The weights of the n-grams in the segment according to the second data type sum to 67.5.

If the thresholds for the first data type, the second data type, and the third data type were set by the user to 20, 30, and 40, respectively, then the segment selected in FIG. 6 would be determined to be of the third data type. The presence of this data type at this segment location is recorded.

Figure 9:
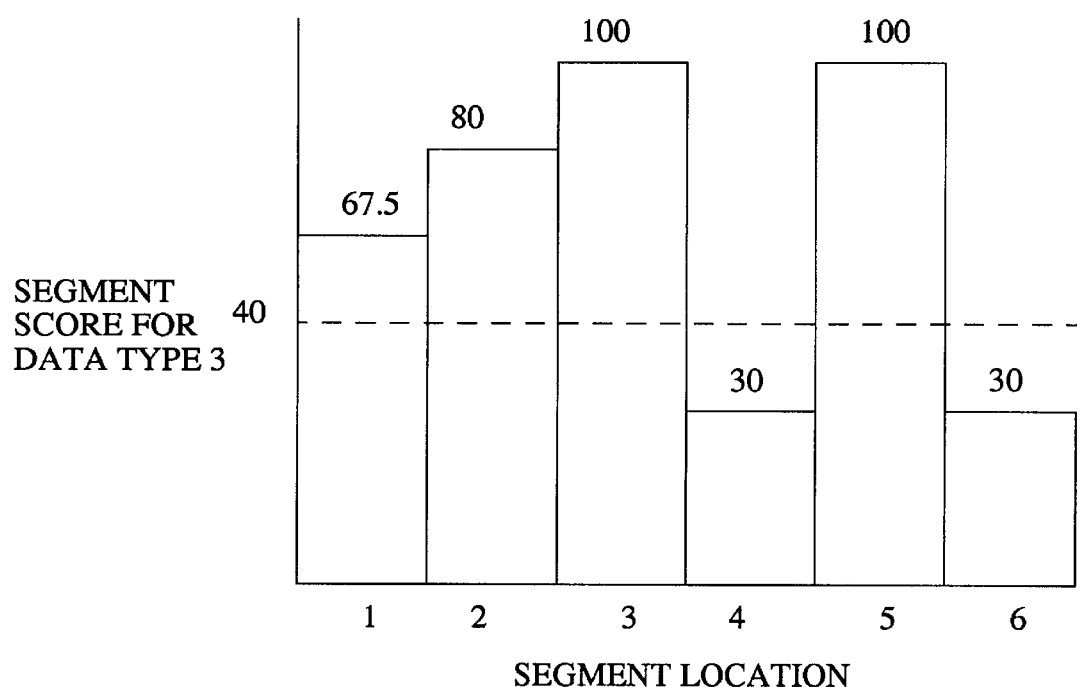
FIG. 9 is a graph of six sums of the third data type for corresponding file segments and how they compare to the threshold for the third data type.

FIG. 9 is an illustration of the file of FIG. 6 with the starting location of the next selected segment moved one position to the right of the starting position of the previously selected segment.

If the file described above also contains five additional segments that receive sums of 80, 100, 30, 100, and 30 for the third data type, respectively, then the file is determined to contain data of the third type in the first, second, third, and fifth locations, but not in the fourth or sixth locations. This is illustrated in FIG. 9. Alternatively, it may be recorded that the threshold for the third data type was exceeded in four of six segments, without regard to the specific location of any one segment. Such a statistic gives an indication of the function of the file.

What is claimed is:

1. A method of identifying the type of data contained in an electronic file of unknown data type, comprising the steps:

a) gathering at least one exemplary file of each data type of interest;
   b) counting the number of unique n-grams within each at least one exemplary file,
   where n is user-definable range of integers;
   c) determining a weight for each unique n-gram for each data type of interest as follows:

$$w_{ti} \equiv (\log(K(x_{ti}/N_t)+1)) \times ((1/\log N_t)(\Sigma(p_{tji}\log(1/p_{tij})))) \times (1-((1/\log L)(\Sigma(p_{ti}\log(1/p_{ti})))))^d,$$

where $w_{ti}$ is the weight of a particular n-gram i for a particular data type t;
   where K is a constant that scales the term $(x_{ti}/N_t)$ away from unity;
   where $N_t$ is the number of documents of type t;
   where $x_{tji}$ is the number of occurrences of an n-gram i in exemplary document j of type t divided by the total number of bytes in document j;
   where $x_{ti} = \Sigma x_{tji}$, summed from j=1 to j=$N_t$;
   where $p_{tji} \equiv x_{tji}/x_{ti}$;
   where $\Sigma(p_{tji}\log(1/p_{tij}))$ is summed from j=1 to j=$N_t$;
   where L is the number of data types of interest;
   where $x_i = \Sigma x_{ti}$, summed from t=1 to t=L;
   where $p_{ti} \equiv x_{ti}/x_i$;
   where $\Sigma(p_{ti}\log(1/p_{ti}))$ is summed from t=1 to t=L; and
   where d is a positive real number that controls the concavity of the term that contains d;

d) listing the unique n-grams in the at least one exemplary file of a particular data type of interest in order of descending magnitude of weight for each data type of interest;
   e) selecting the top m weighted n-grams and their associated weights from each list generated in the last step, where m is a user-definable integer;
   f) establishing a user-definable threshold for each data type of interest for determining data type;
   g) selecting a user-definable length of data from the electronic file of unknown data type;
   h) listing every n-gram in the data selected in the last step, where n has the same range of integer values as in step (b);
   i) giving each n-gram listed in the last step that was also selected in step (e) the weight that that n-gram was given in step (c) for each data type of interest;
   j) summing the weights given to each n-gram in the last step according to data type;
   k) comparing the sums in the last step to the thresholds established in step (f) in order to determine the data types, if any, of the selected data;
   l) recording the location of the selected data if it is determined to be of any data type of interest;
   m) stopping if the number of selected lengths of data reached a user-definable number of selected lengths of data, otherwise selecting another length of data from the file that is the same length as the data selected previously, where the data selected in this step overlaps with the previously selected data by at least one position; and
   n) repeating step (h) through step (m) using the data selected in the last step.

2. The method of claim 1, wherein said step of gathering at least one exemplary file of each data type of interest is comprised of gathering at least one exemplary file of each data type of interest wherein said data type of interest is selected from the group consisting of any language, any wordprocessor, any executable code, and any data compression scheme.

3. The method of claim 1, wherein said step of counting the number of unique n-grams is comprised of counting the number of unique n-grams within each at least one exemplary file, where n is a range of integers from 1 to 8.

4. The method of claim 1, wherein said step of determining the weight of each unique n-gram where K is a constant is comprised of determining the weight of each unique n-gram where K is $10^5$.

5. The method of claim 1, wherein said step of determining the weight for each unique n-gram where d is a positive real number is comprised of the step of determining the weight for each unique n-gram where d is 3.

6. The method of claim 1, wherein said step of selecting the top m weighted n-grams and their associated weights for each list is comprised of selecting the top 2000 weighted n-grams and their associated weights for each list.

7. The method of claim 1, wherein said step of selecting a user-definable length of data from the file is comprised of selecting 250 bytes of data from the beginning of the file.

8. The method of claim 1, wherein said step of selecting a user-definable length of data from the electronic file of unknown data type is comprised of selecting the entire electronic file of unknown data type.

9. The method of step 1, wherein said step of stopping if the number of selected lengths of data reached a user-definable number of selected lengths of data is comprised of stopping if the end of the electronic file is reached, otherwise selecting another length of data that is one byte position to the right of the previously selected length of data.

10. The method of claim 1, wherein said step of recording the location of the selected data is comprised of recording the location of the selected data as being the center of the selected data.

11. The method of claim 2, wherein said step of counting the number of unique n-grams is comprised of counting the number of unique n-grams within each at least one exemplary file, where n is a range of integers from 1 to 8.

12. The method of claim 11, wherein said step of determining the weight of each unique n-gram where K is a constant is comprised of determining the weight of each unique n-gram where K is $10^5$.

13. The method of claim 12, wherein said step of determining the weight for each unique n-gram where d is a positive real number is comprised of the step of determining the weight for each unique n-gram where d is 3.

14. The method of claim 13, wherein said step of selecting the top m weighted n-grams and their associated weights for each list is comprised of selecting the top 2000 weighted n-grams and their associated weights for each list.

15. The method of claim 14, wherein said step of selecting a user-definable length of data from the file is comprised of selecting 250 bytes of data from the beginning of the file.

16. The method of step 15, wherein said step of stopping if the number of selected lengths of data reached a user-definable number of selected lengths of data is comprised of stopping if the end of the electronic file is reached, otherwise selecting another length of data that is one byte position to the right of the previously selected length of data.

17. The method of claim 16, wherein said step of recording the location of the selected data is comprised of recording the location of the selected data as being the center of the selected data.

* * * * *